Patented Dec. 6, 1932

1,890,191

UNITED STATES PATENT OFFICE

JOSEPH C. PATRICK, OF TRENTON, NEW JERSEY

METHOD OF MAKING PLASTIC SUBSTANCES AND PRODUCTS OBTAINED THEREBY

No Drawing. Application filed May 18, 1931, Serial No. 538,389, and in Canada May 28, 1928.

My invention relates to organic products and methods of making the same.

The products are made by the interaction of polysulfides and olefinic compounds containing the group $C_nH_{2n}$ combined with a negative radical. The preferred polysulfides are soluble and as examples I may mention those of the alkali metals, alkaline earth metals and ammonia, which, for convenience, I call "alkaline polysulfides". Other polysulfides may be used.

The olefinic substances which I prefer to use are the compounds of olefines containing the group $C_nH_{2n}$. I have found the following olefinic compounds to be particularly useful for this purpose: amylene dihalide, butylene dihalide, propylene dihalide, ethylene dihalide and also methylene dihalide. Those above named as purchasable on the market and are preferred for that, among other reasons. I have also found that other olefinic compounds may be used, such as, the olefin sulfates and acetates and aldehydes, such as, formaldehyde and acetaldehyde, for example. While the last named substances may be used, they are not as desirable as the ones first mentioned, because either they are not available commercially or do not react as completely as those first mentioned.

The olefinic compounds which I have used to the greatest extent are the halogen additive compounds of ethylene and propylene. If such compounds of higher members of the olefin series are used, the products are less elastic than if the compounds of the lower members of the olefin series are used. The plastics derived from ethylene additive compounds, I find to be somewhat better for most purposes than those derived from propylene or methylene compounds.

The negative radicals which I have used and found satisfactory, are those of the chlorides, bromides, iodides, sulfates, acetates and oxides, but of these I prefer to use the chlorides.

Either dichlorides or dibromides of olefins may be used, but I prefer the dichlorides because the reaction is faster and the chlorides are cheaper. I also prefer the polysulfides of calcium and sodium or mixtures thereof because of their cheapness, although potassium and ammonium polysulfides and mixtures of one or more of them with other polysulfides give generally similar results.

The nature of the product varies with the amount of sulfur in the polysulfide, ranging from hard products, like vulcanite, to softer elastic products, somewhat like soft rubber and including products of intermediate degrees of hardness. Polysulfide solutions with a sulfur content corresponding approximately to the formulæ $CaS_4$ and $Na_2S_4$, and other polysulfides of about the same rank, as for example those of barium, potassium and ammonium, tend to give a softer product, while polysulfide solutions with a lower sulfur content give harder products.

The reaction proceeds at ordinary temperatures but is accelerated by moderate heating. It is apparently substantially quantitative, that is, if either a small amount of olefinic compound or a small amount of polysulfide is left over from a reaction, it can be used up by adding a small amount of the equivalent of the other component.

I prefer to use an aqueous polysulfide solution of approximately the specific gravity of the olefin compound (at the reaction temperature) so that the liquids may be readily maintained intermixed.

The invention is illustrated by the following examples:

Example I 750 grams of hydrated sodium sulfide ($Na_2S.9H_2O$) is dissolved in approximately a liter of water and the solution is boiled with 300 grams of sulfur to produce a solution of polysulfide believed to be largely $Na_2S_4$, although a certain amount of $Na_2S_5$ is doubtless formed. If larger amounts of sulfur are used in this example, still greater proportions of $Na_2S_5$ will be formed.

Water is added to make the specific gravity at 70° C. approximately that of ethylene dichloride producing about 1200 to 1300 cc. of solution. About 300 cc. of ethylene dichloride are added and the mixture gradually heated to about 70° C., preferably in a vessel having a reflux condenser. The reaction proceeds rapidly and is completed after digesting for an hour or more at such a temperature that active refluxing of the ethylene dichloride and steam occurs. The mixture is then cooled and the liquid portion is drawn off, leaving a yellow plastic. This is boiled with water to drive off occluded volatile compounds and to extract soluble salts, the boiling preferably being repeated several times, and the plastic being comminuted between boilings. The purified plastic is substantially free from halogen, is of high coherence, resiliency and pliability, and has elasticity somewhat similar to that of soft rubber. It is only slightly soluble in most ordinary organic solvents, although somewhat swollen by carbon disulfide. It can be worked, molded and rolled into sheets at temperatures around 130°–140° C.

*Example II*

A mixture of additive chlorine compounds of the olefins in cracked petroleum gases is used. This is mainly ethylene dichloride and propylene dichloride. A slurry of lime is boiled with sulfur until saturated and diluted to have the same specific gravity as the halide oil at about 80° C. This polysulfide solution is thought to contain a substantial quantity of $CaS_4$ and $CaS_5$, and other high polysulfides.

One hundred gallons of the calcium polysulfide solution is mixed with approximately fifty gallons of the oily halides and digested in a reflux apparatus at the boiling point of the mixture. The reaction is slower but the products are quite similar to those of Example I.

In general, I have found that the softer and somewhat rubbery type of product is produced when the polysulfide used contains from about 3.5 to about 5 times the amount of sulfur in the formula of the simple sulfide. The hard vulcanite-like type of product is usually produced when a polysulfide is used containing from about 1.5 to about 3.5 times the amount of sulfur in the formula of the simple sulfide, that is, for example, by using the lower polysulfides corresponding in sulfur content to $Na_2S_2$ or $Na_2S_3$, or a mixture thereof. The reaction is conducted as described in Examples I and II. These harder plastics or products may be softened by heat and molded and machined and polished when cold. With increasing sulfur content, the physical characteristics of the products gradually approach those of soft rubber, there being an intermediate range in which the products have in part the physical characteristics of both hard and soft rubber. For the purpose of the present application, such intermediate products are classified as "soft" products.

The plastics obtained by using potassium and ammonium polysulfides are quite similar to those above described. In the reaction with ammonium polysulfides there is a tendency toward decomposition which results in a plastic having an abnormally high sulfur content.

The new products or plastics resulting from my invention have a high sulfur content. This varies over a considerable range, that of the soft plastic made from ethylene dichloride, for instance, being between about 78% to about 84% sulfur and the sulfur content of the harder plastics being generally lower than 78%, down to about 70%.

I have found that the product resulting from the method above described has many uses without being admixed with other substances. It also has many uses when mixed with other substances, such as metallic oxides, as, for example, lead oxides, zinc oxides, etc., various proportions of rubber over a very wide range, carbon black, mineral fillers, such as barium sulfate, clay, diatomaceous earth, and many other substances generally known to be useful in connection with rubber and other plastics.

This application is in part a continuation of my application Serial No. 239,808, filed December 13, 1927.

I claim:

1. The method which comprises causing reaction between alkaline polysulfides and olefinic compounds containing the group $C_nH_{2n}$ combined with the equivalent of two monovalent negative radicals.

2. The method which comprises causing reaction between alkaline polysulfides and additive olefinic compounds containing the group $C_nH_{2n}$ combined with the equivalent of two monovalent negative radicals.

3. The method which comprises causing reaction between alkaline polysulfides and halogen compounds of olefins of the formula $C_nH_{2n}X_2$ where X is a halogen.

4. The method of producing plastics which consists in causing reaction between additive halogen compounds of olefins of the general formula $C_nH_{2n}$ and alkaline polysulfides.

5. The method of producing plastics which consists in causing reaction between additive halogen compounds of olefins of the general formula $C_nH_{2n}$ and soluble alkaline polysulfides.

6. The method of producing plastics which consists in causing reaction between additive halogen compounds of an olefin of the general formula $C_nH_{2n}$ and polysulfides of calcium.

7. The method of producing plastics which consists in causing reaction between chlorine additive compounds of hydrocarbons of the formula $C_nH_{2n}$ where $n$ is not greater than 5 and aqueous solutions of polysulfides.

8. The method of producing plastics which consists in causing reaction between chlorine additive compounds of hydrocarbons of the formula $C_nH_{2n}$ where $n$ is not greater than 5 and aqueous solutions of alkaline polysulfides.

9. The method of producing plastics which consists in agitating together chlorine additive derivatives of hydrocarbons of the formula $C_nH_{2n}$ where $n$ is not greater than 5 and an aqueous solution of alkaline polysulfides of substantially the same specific gravity, and heating.

10. The method of producing plastics which consists in causing reaction between halogen additive compounds of hydrocarbons of the formula $C_nH_{2n}$ where $n$ is not greater than 5 and an alkaline polysulfide containing from about one and one-half times to about five times the amount of sulfur contained in the corresponding sulfide.

11. The method of producing plastics having mechanical properties resembling those of soft vulcanized rubber, which consists in causing reaction between ethylene dichloride and an alkaline polysulfide containing about three and a half to five times the amount of sulfur contained in the corresponding sulfide.

12. The method of producing plastics which consists in causing reaction between additive halogen compounds of olefins of the general formula $C_nH_{2n}$ containing less than four carbon atoms, and aqueous solutions of alkaline polysulfides.

13. The method of producing plastics which consists in causing reaction between additive chlorine compounds of olefins of the general formula $C_nH_{2n}$ containing less than four carbon atoms, and an aqueous solution of calcium polysulfide.

14. The method of producing plastics which comprises admixing a dihalide of an olefin of the general formula $C_nH_{2n}$ and an aqueous solution of a soluble polysulfide, thereby effecting reaction therebetween and forming a plastic body.

15. The method of producing a plastic which comprises admixing a dihalogen addition compound of an olefin of the general formula $C_nH_{2n}$ and an aqueous solution of a soluble polysulfide having 3.5 to 5 times the sulfur content of the corresponding sulfide.

16. The method of producing a plastic which comprises admixing a dichloride of olefin of the general formula $C_nH_{2n}$ and a solution of a water soluble polysulfide, initially heating the mixture to accelerate reaction, continuing the reaction to substantial completion, and removing substantially all alkaline compounds to form a substantially halogen-free product.

17. The method of producing an olefin polysulfide plastic which comprises admixing a dichloride of olefin of the general formula $C_nH_{2n}$ and a water-containing solution of a water-soluble polysulfide warming the mixture to accelerate reaction, and maintaining a reaction temperature not above the boiling point of the mixture while completing the reaction, thereby forming a plastic material.

18. The method of producing an olefin polysulfide plastic which comprises admixing a dichloride of olefin of the general formula $C_nH_{2n}$ and a water-containing solution of a water-soluble polysulfide, said solution being diluted to substantially the same specific gravity as the olefin dichloride, thereby effecting reaction and formation of a plastic body.

19. The method of producing an elastic caoutchouc-like body, which comprises treating chlorides of olefins of the general formula $C_nH_{2n}$ with a sulphur saturated alkaline polysulfide to form sulfur derivatives of gaseous olefin.

20. The method of producing an elastic caoutchouc-like body, which comprises treating chlorides of olefins of the general formula $C_nH_{2n}$ with an alkaline sulfur solution containing excess sulfur.

21. A plastic comprising sulfur and olefin of the general formula $C_nH_{2n}$ chemically combined, the chemically combined sulfur being at least 70% of the compound.

22. A product comprising the reaction products between alkaline polysulfides and olefin compounds containing the group $C_nH_{2n}$ combined with the equivalent of two monovalent negative radicals.

23. A product comprising a composition composed mainly of chemically combined sulfur, said composition being the reaction products of alkaline polysulfides and additive olefin compounds containing the group $C_nH_{2n}$ and the equivalent of two monovalent negative radicals.

24. A produce comprising a composition composed mainly of combined sulfur, said composition being the reaction products of halogen compounds of olefins of the formula $C_nH_{2n}X_2$ where X is a halogen.

25. A product comprising a composition composed mainly of chemically combined sulfur, said composition being the reaction products of alkaline polysulfides and additive halogen compounds of olefins of the formula $C_nH_{2n}$.

26. A plastic comprising mainly combined sulfur, said plastic being the reaction products of alkaline polysulfides and compounds of hydrocarbons of the formula $C_nH_{2n}X_2$ where $n$ does not substantially exceed 5, and where X is a negative radical.

27. A plastic comprising mainly chemically combined sulfur, said plastic being the reaction products of alkaline polysulfides and dihalides of olefins of the general formula $C_nH_{2n}$.

28. A plastic comprising mainly combined sulfur, said plastic being the reaction products of alkaline polysulfides and additive compounds of olefins having the general formula $C_nH_{2n}X_2$ where X is a negative radical.

29. A plastic comprising not less than 70% sulphur in chemical combination with $C_nH_{2n}$ groups.

30. A product comprising a compound composed of not less than 70% sulphur in chemical combination with $C_nH_{2n}$ groups corresponding to olefins having less than four carbon atoms.

31. A moldable plastic substance containing between about 70% and about 84% of sulfur, combined with $C_nH_{2n}$ radicals.

32. A moldable plastic substance comprising a compound having between about 78% and about 84% of sulfur combined with $C_nH_{2n}$ radicals.

33. A moldable plastic substance containing between about 78% and about 84% of sulfur, obtained by the interaction of ethylene compounds of the formula $C_nH_{2n}X_2$ where X is a negative radical with soluble alkaline polysulfides containing about 3.5 to 5 times the amount of sulfur contained in the corresponding normal sulfide.

34. A plastic containing about 78% to about 84% sulfur chemically combined with $C_nH_{2n}$ groups.

35. An agglomerated plastic containing from about 70% to about 84% sulfur chemically combined with $C_nH_{2n}$ groups.

36. An agglomerated plastic containing from about 70% to about 84% sulfur chemically combined with ethylene.

37. A soft plastic containing from about 78% to about 84% sulfur chemically combined with ethylene.

JOSEPH C. PATRICK.